July 24, 1956 — L. CLEMENS — 2,755,856
APPARATUS FOR THE SIMULTANEOUS CUTTING OF THICK LAYERS
OF PACKING MATERIAL INTO LONGITUDINAL STRIPS
Filed Jan. 5, 1954 — 4 Sheets-Sheet 1

Inventor:
Ludwig Clemens

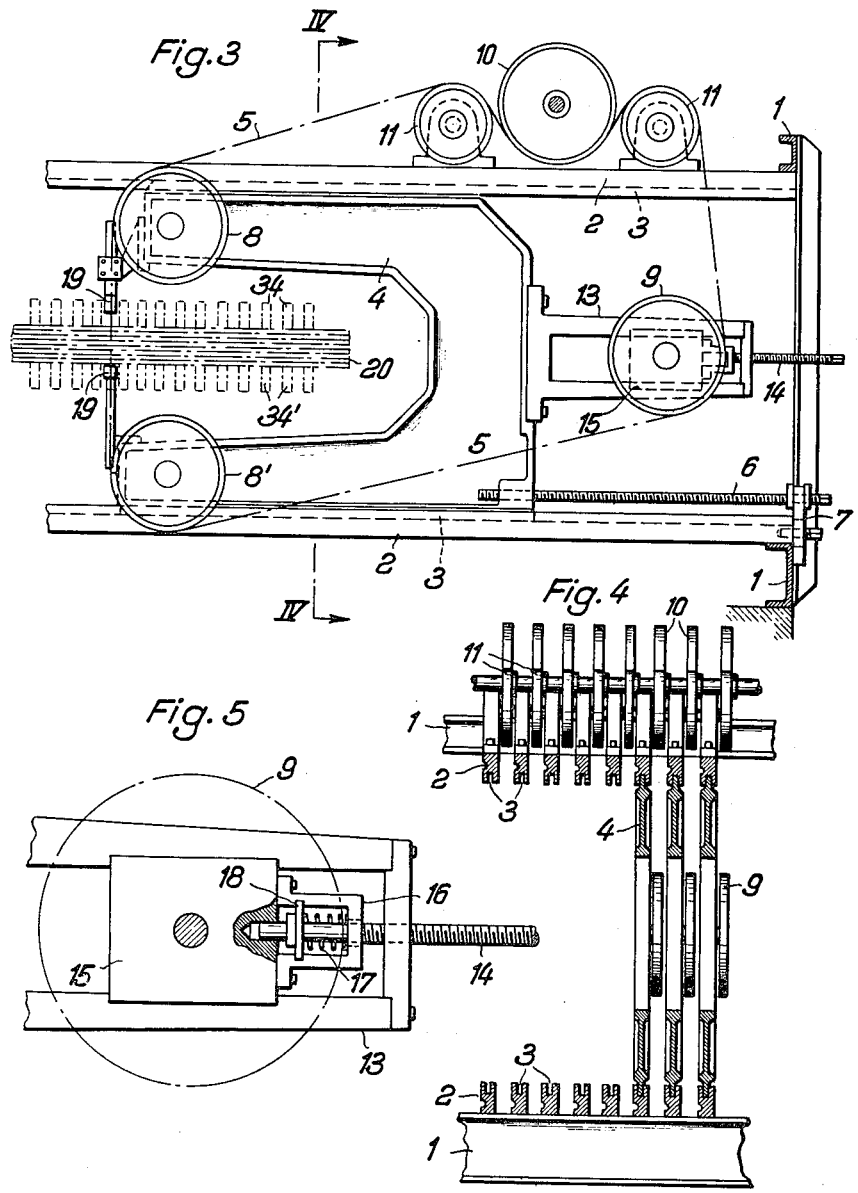

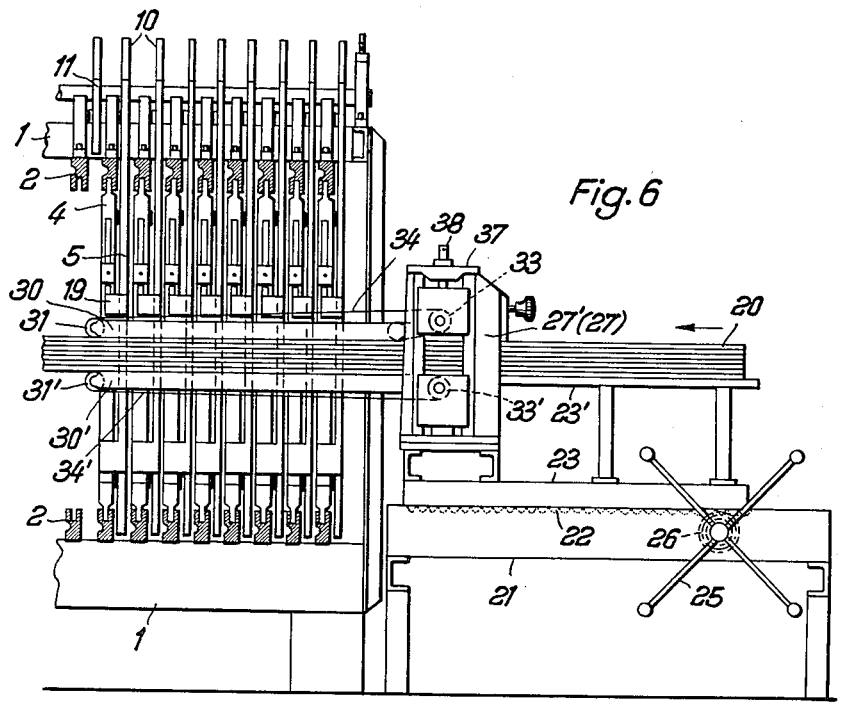
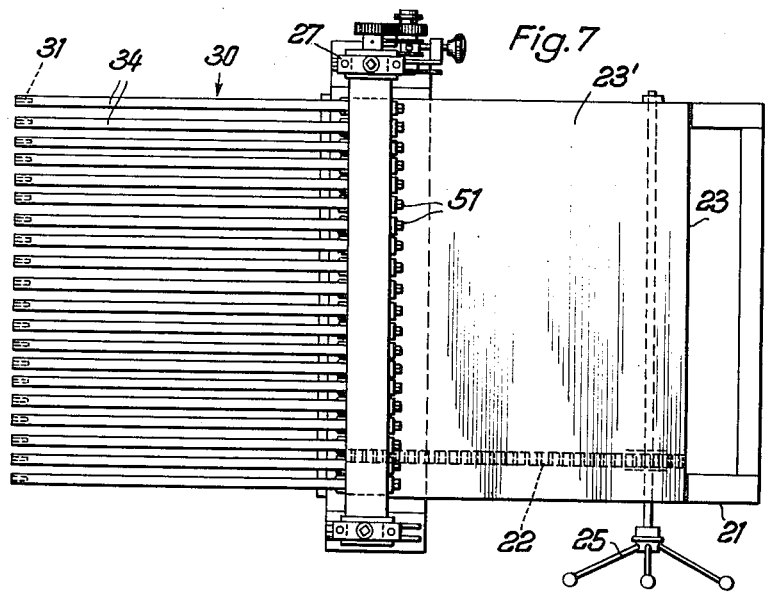

July 24, 1956

L. CLEMENS 2,755,856

APPARATUS FOR THE SIMULTANEOUS CUTTING OF THICK LAYERS
OF PACKING MATERIAL INTO LONGITUDINAL STRIPS

Filed Jan. 5, 1954

*Inventor:*
*Ludwig Clemens*

United States Patent Office 2,755,856
Patented July 24, 1956

2,755,856

APPARATUS FOR THE SIMULTANEOUS CUTTING OF THICK LAYERS OF PACKING MATERIAL INTO LONGITUDINAL STRIPS

Ludwig Clemens, Wiesbaden, Germany

Application January 5, 1954, Serial No. 402,216

Claims priority, application Germany January 14, 1953

6 Claims. (Cl. 164—35)

This invention relates to apparatus for cutting simultaneously thick layers of packing material into longitudinal strips.

The material employed for packing purposes, such as paper or pasteboard, is generally manufactured in the form of long and relatively wide webs which must then be cut into smaller pieces according to the purpose for which the material is to be employed. Since the packing material must be as cheap as possible, the working operations by which the packing material is cut up must be made as economical as possible. It is not possible with the existing apparatus to cut packing materials such as fine corrugated paper or packing paper to predetermined sizes in an economical manner, particularly as the dimensions to which the material is to be cut vary considerably according to the use for which it is intended, so that the apparatus must be constantly adjusted to the required dimensions.

Apparatus for cutting a number of superimposed paper webs into individual webs or thin layers are known which operate completely satisfactorily for this purpose. These known means are generally equipped with circular blades or with revolving shears over which the paper webs are passed. Such cutting devices, operating with circular blades or with revolving shears, however, are entirely unsuitable for the simultaneous cutting of thick layers of packing material. The disc-shaped blades would in this case have to have a very large diameter in order to be able to penetrate through the whole stack of packing material, which in turn would mean that the blades would have to be very thick in order to have the necessary strength; satisfactory cutting of the thick layers of packing material would be rendered impossible, as the thick blades would jam in the packing material or tear the individual layers.

For the reasons stated, the known arrangements are suitable only for cutting relatively thin webs. The webs are fed in open form to the circular blades or revolving shears. Experience shows that only webs of paper or cellulose wadding of a thickness of, at most 10 to 12 mm. can be cut with these known arrangements. For cutting thick layers of packing material comprising, for example, about fifty superimposed individual layers, these known arrangements comprising circular blades and in which the webs are guided in the loose or open condition are completely unsuitable.

The object of the invention is to provide an improved arrangement which is highly suitable for the simultaneous cutting of thick layers of packing material into longitudinal strips in the most economical manner.

According to the invention, the apparatus is characterised by a number of rectilinearly moved cutting blades arranged one behind the other in the direction of forward feed of the layers and adapted to be displaced independently of one another in a direction laterally of the said direction of forward feed, and a conveying device which conveys the layers in a compressed condition to the cutting blades. By means of this arrangement, about 25 to 50 webs of fine corrugated paper can readily be simultaneously cut into strips in a completely satisfactory manner.

The new cutting arrangement is based upon three essential features. In contrast to all known cutting arrangements, the arrangement according to the invention comprises rectilinear cutting blades which are moved rectilinearly. The individual cutting blades are arranged one behind the other as seen in the direction of forward feed of the packing material, because it is thereby possible to displace the individual blades completely independently of one another in a direction laterally of the direction of forward feed of the packing material. In this way, the width of the strips to be cut can conveniently be adjusted. Moreover, it is possible with this arrangement to cut strips of different widths simultaneously from the packing material.

The layers to be cut are guided to and through the cutting blades in the compressed condition and not in the open condition. The layers of packing material to be cut are preferably drawn from the supply frames by conveyor belts and positively moved forward while being compressed between the conveyor belts. Only if the layers of packing material are cut while in the compressed condition can a satisfactory cutting be effected without the material being torn or shredded. Moreover, the packing material (corrugated paper, padding paper, cartridge paper, crepe paper or the like) generally has a loose structure, whereby a smooth, clean cut is rendered more difficult. The arrangement according to the invention, however, meets this difficulty.

The rectilinearly moved, rectilinear cutting blades are preferably designed in the form of travelling endless band blades. Each of these band blades is gripped in a frame, the individual frames being arranged to be moved independently of one another in a direction laterally of the direction of forward feed of the layers of packing material. In order that relatively wide webs may also be cut and guided through the frames, the frames are preferably given the form of a C. The two arms of this C form to some extent cantilevers between which the layers of packing material to be cut are passed. Each band blade travels over a guide roller mounted on one of the ends of the horizontal arms of the C. The effective cutting point lies between these two guide rollers, over which the band blade travels in a vertical run.

Also mounted on the frame is a further guide roller for the band blade, which further roller can be adjusted within the plane of the frame and serves to tension the band blade. Preferably, the said guide roller serving for the tensioning is resiliently mounted in order to keep the blade constantly taut.

The frames arranged one behind the other in the direction of forward feed of the packing material, together with the band blades, are mounted in a chassis comprising a number of parallel juxtaposed grooved guide members in the upper and lower horizontal sides of said chassis, between which members the frames are displaceably mounted on their upper and lower longitudinal edges respectively.

All the band blades arranged on the individual frames independently displaceable with respect to one another have a common drive. For this purpose, each band is guided over a driving roller mounted in the plane of the blade on the chassis, against which roller the band blade is pressed, if desired, by idler rollers also mounted on the chassis. The driving rollers associated with the individual band blades and frames are all fixedly mounted on a common shaft, which is in turn mounted on the chassis laterally of the parallel planes of the frames and is driven, for example, by an electric motor.

Preferably, the whole arrangement is symmetrically constructed in relation to a central axis extending in the direction of forward feed. This means that a pair of frames lie with their open arms facing towards one another in the same plane and are guided independently of one another in the grooved guide members. The arrangement consequently comprises two juxtaposed sets of frames arranged one behind the other with band blades. A driving shaft mounted on the chassis in the manner described is provided for each set.

An essential part of the new arrangement, without which this arrangement cannot operate satisfactorily, is the conveying device by which the layers of packing material are passed in the compressed condition to and through the cutting blades. As already mentioned, this conveying arrangement may consist of endless conveyor belts travelling in a closed path above and below the layers and simultaneously compressing the layers.

The difficulty here arises that the individual cutting blades are arranged one behind the other and the layers of packing material must be conveyed in the compressed condition through these succeeding cutting blades. For this purpose, the conveying and pressing belts arranged above and below the layers must each be subdivided into a number of narrow individual belts which lie in spaced adjacent relationship, the band blades being disposed in the gaps between the said belts. The individual belts are held by arms mounted in rake-like formation on one end of a cross member. The arms with the narrow belts guided therein may be disposed between the individual band blades. The lateral spacing between these arms must naturally be adaptable to the spacing between the band blades. For this purpose, the rake-like arms are displaceably mounted on the cross member. Each arm is provided at each of its two ends with a guide pulley for the belt, the pulley situated on that end of the arm which is held by the cross member being driven. The driven belt-guiding pulleys for one row of belts are mounted on a common driven shaft mounted on the cross member. Both the series of belts situated above the layers of packing material and that situated below the said layers may be driven. However, it is equally possible for only the upper row of belts to be driven and for the lower row of belts to be carried along by the layers of packing material lying thereon.

Since the total thickness of the layers of packing material to be cut will not always be the same, the upper row of belts by which the layers are compressed must be vertically adjustable. In order that this upper driven row of belts may be vertically adjusted, the shaft by which the said row of belts is driven and which is vertically adjustable is driven through a gear wheel mounted on the pivotally secured bell-crank lever and arranged to be adapted to the various levels of the shaft by the rocking of the bell-crank lever.

The cross members by which the individual arms for the belts are held are mounted in bearings connected to a table. The said table lies at the level of the lower row of belts and serves to receive the layers of packing material and to introduce them between the two rows of conveyor belts. The bearing brackets and the table are mounted on a carriage which is adapted to be horizontally reciprocated in the direction of forward feed of the layers of packing material on a chassis. The conveyor belts can be drawn between and retracted from the individual band blades by means of the said reciprocating movement of the carriage. In order that this movement may be carried out in the most convenient manner possible, the carriage may be displaced on the chassis by means of a gear wheel mounted on a handwheel shaft which is in turn mounted in the frame, and by means of a toothed rack provided on the carriage.

One embodiment of the invention is illustrated in the accompanying drawings, in which:

Fig. 3 illustrates on a larger scale one of the adjustable blade frames having an endless band blade mounted thereon.

Fig. 4 is a section on the line IV—IV of Fig. 3,

Fig. 5 shows separately a tensioning device for the band blade,

Figure 8:
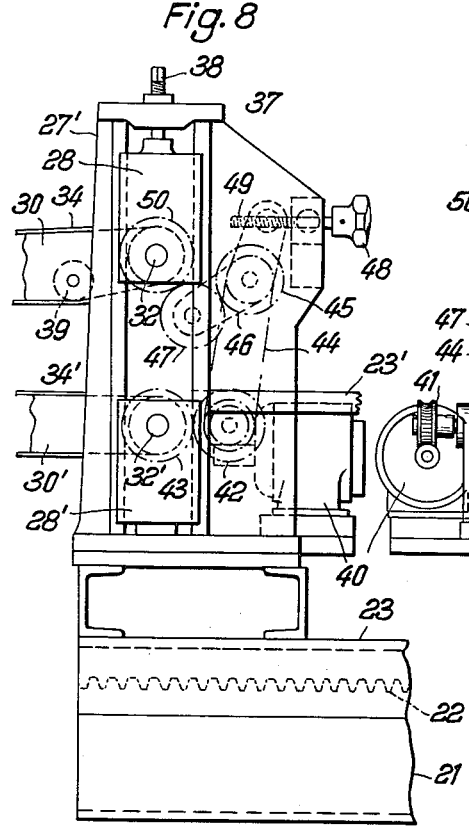
Figure 9:
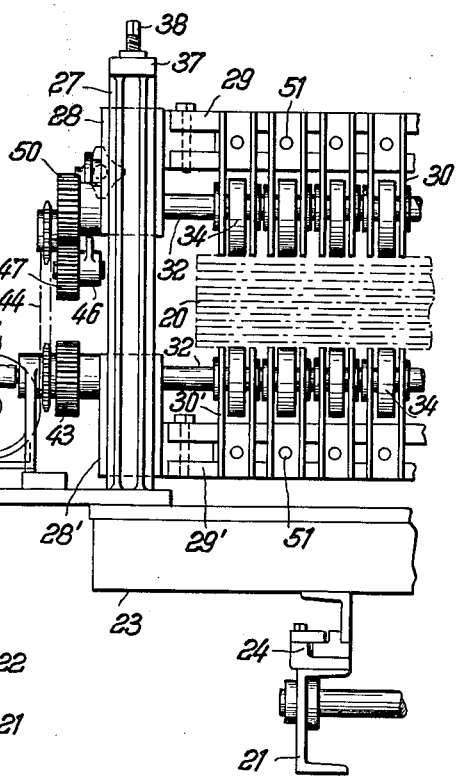
Figure 10:
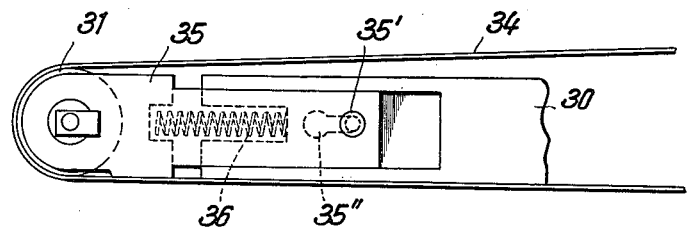

Fig. 6 is a cross-section through the cutting machine having a conveyor arrangement and fitted conveyor belts mounted in front thereof, Fig. 7 is a plan view of the conveyor arrangement, Fig. 8 is a side elevation of the driving device for the conveyor belts, Fig. 9 is a corresponding end elevation as seen from the conveyor belt side, and Fig. 10 is a fragmentary view of the arm of a conveyor belt on a larger scale.

Figure 1:
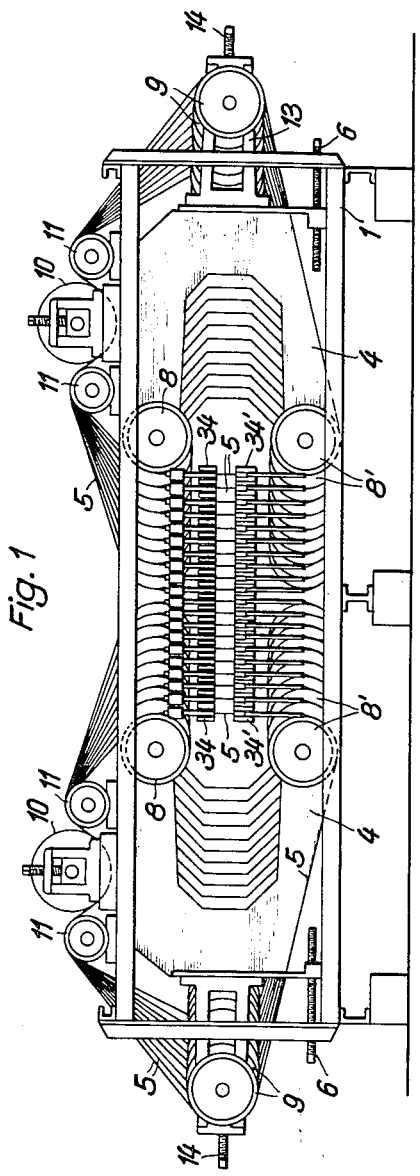
Fig. 1 is a front elevation of the cutting machine, the conveying arrangement for introducing the material into the machine having been omitted.

A frame-like chassis 1 is provided with upper and lower horizontal guide rails 2 which are provided with slots 3 in which C-shaped cutting frames 4 are mounted and which are adapted to be displaced and secured therein, the said frames serving to guide band blades 5, and being disposed one behind the other as seen in the direction of forward feed of the stack of pasteboard or paper which is to be cut, which direction is perpendicular to the drawing in Figs. 1 and 3.

Figure 2:
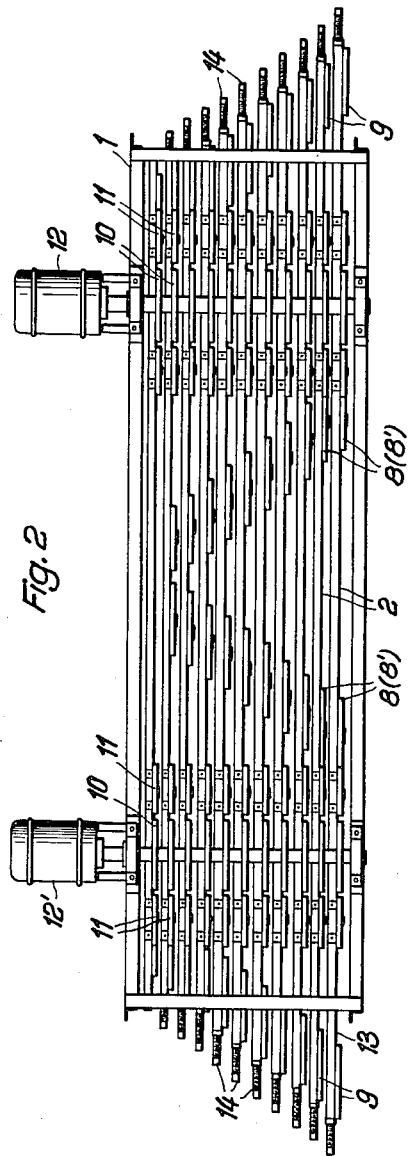
Fig. 2 is a plan view corresponding to Fig. 1, the band blades having been omitted.

By displacement of the individual frames 4 along their respective guide rails 2, the distance between the band blades 5, longitudinally of Fig. 1, and consequently the width of the strips cut from the paper stack may be varied. The cutting frames 4 are symmetrically staggered, longitudinally of Figs. 1 and 2, from both ends of the chassis 1 towards the centre in accordance with the number of fine paper strips to be cut. The frames 4 may be set with the blades 5 in transverse planes at exact distances apart, corresponding to the width of the paper strips to be cut, by means of screw-threaded pins 6 which are rotatably mounted on the outer end of the guide rails 2 in retaining members 7 (Fig. 3).

The cutting frames 4 are provided with guide rollers 8, 8' and 9 for the endless travelling band blade 5, which is guided over a pulley 10 driven by an electric motor 12 and mounted on the upper side of the chassis 1, and over idle rollers 11 mounted laterally thereof. All the pulleys 10 serving to drive the series of band blades at one end of the frame 1 are mounted on a common shaft which is mounted on the chassis 1 and driven by the electric motor 12. The pulleys 10 thus do not follow the movement of the frames 4 during the displacement, and the idler rollers 11 also do not follow the said movement. A separate drive is provided for the right-hand and left-hand sets of cutting frames, by electric motor 12, 12'.

The guide rollers 9 also operates as a tensioning roller for the band blade 5 and for this purpose it is mounted in a block 15 adapted to be displaced in a slideway 13, mounted on the frame 4, by means of a screw-threaded spindle 14 (Fig. 5). The screw-threaded spindle 14 is loosely guided in a stirrup 16 which is secured to the block 15 and in which a compression spring 17 is provided which bears against a disc 18 mounted on the spindle 14 and against a cross-head of the stirrup. The band blade is thus constantly maintained under spring tension during the cutting operation. For the purpose of placing the band blade in position, the screw-threaded spindle 14 is loosened.

Blade guides 19, 19 are provided in known manner at the cutting point of the blade frame 4. The upper blade guide 19 is vertically adjustable in order that it may be adapted to the particular height of the stack of paper 20 which is to be cut.

The stack of paper 20 is fed to the cutting edges of the band blades by means of a conveyor arrangement (Fig. 6) adapted to be introduced into cutting machine, the said conveyor arrangement resting on a frame 21 adapted to be mounted in front of the cutting machine. A carriage 23 provided with a toothed rack 22 is displaceably arranged in guides 24 (Fig. 9) on the frame 21 and is adapted to be moved towards and away from the cutting machine by means of a spider hand-wheel 25 and a toothed wheel 26 connected thereto.

Two bearing brackets 27, 27' (Figs. 6 to 9) are mounted on the carriage 23 at the end nearer the cutting machine, and two bearing blocks 28, 28' are displaceably mounted one above the other in each of the said bearing brackets. The bearing blocks 28—28 and 28'—28' disposed on opposite sides of the carriage 23 are detachably connected together by cross-members 29, 29', respectively, which support two superimposed rows of parallel horizontal rake-like arms 30, 30' which project towards the cutting machine and have rollers 31, 31' mounted on the forward free ends thereof. The lateral spacing between the arms 30 or 30' can be adjusted by displacing them on shafts 32, 32' and adapted to the longitudinal spacing between the band blades, so that the arms can be passed between the band blades without striking against them or touching them.

Mounted parallel to the cross members in the bearing blocks are shafts 32, 32' having rollers 33, 33' mounted thereon, which correspond to the rollers 31, 31' and support travelling endless conveyor belts 34, 34'. The said conveyor belts 34, 34' engage, respectively, the top and bottom surfaces of the stack of paper which is to be cut and compress said paper stack and guide it positively through the band blades. In order to maintain the tension of the conveyor belts, the forward ends 35 of the arms 30, 30' on which the rollers 31, 31' are mounted are fashioned as slide blocks (Fig. 10). A compression spring 36 disposed in an aperture in the forward end of the arm presses the slide block 35 with the roller 31 in the forward direction and holds the conveyor belt 34, 34' constantly under tension. The slide block 35 is prevented from falling off the arm after the removal of the conveyor belt by a pin 35' which is guided by a bayonet slot 35" in the arm.

The lower bearing block 28' is so mounted in the bearers 27, 27' as to remain stationary during operation, while the upper bearing block 28 is vertically adjustable and can be raised and lowered by a screw-threaded spindle 38 in a bearing cover 37, in order that the vertical spacing between the conveyor belts 34, 34' may be adapted to the thickness of the stack of paper 20 which is to be introduced therebetween. In order to facilitate the introduction of the stack of paper, there is provided on the upper supporting arms 30 in the neighbourhood of the rollers 33 a deflection roller 39 which gradually lowers the path of the lower run of the upper conveyor belt 34 as it leaves the roller 33 so that the passage for the stack of paper between the two conveyor belts gradually decreases. The stack of paper, on entering, bears on a table 23' which is supported on the carriage 23 at the same level as the upper run of the lower conveyor belt 34'.

The conveyor belts are commonly driven at equal speed by an electric motor 40. A gear wheel 42 is driven through a worm gear 41 and engages with a gear wheel 43 arranged on the shaft 32'. A chain 44 drives a gear wheel 45 mounted above in the bearer 27 and meshes with a gear wheel 47 arranged on a rocking lever 46. The lever 46 can be so rocked by means of a screw-threaded spindle 49 provided with a handle 48 that the gear wheel 47 meshes with a gear wheel 50 mounted on the shaft 32, so that the shaft 32 with the conveyor belt pulleys 33 can be driven at any desired level to which they are adjusted.

The arms 30, 30' with the travelling endless conveyor belts are so distributed on the cross members 29, 29' that when they are introduced into the cutting machine they take up a position in the gaps between the band blades 5 which are arranged one behind the other in staggered relationship, as is apparent more particularly from Figs. 1 and 6. It is of minor importance from which side the conveyor arrangement is introduced into the cutting machine; in one case, the division of the stack of paper into strips starts from the centre, while in the other case the strip formation takes place from the outer strips towards the centre.

As previously stated the longitudinal distance between the staggered band blades and consequently the width of the strips into which the stack of papers is cut can be varied as desired by lateral displacement of the blade frames, while the number of strips to be cut may also be varied as desired. Accordingly, in the conveying arrangement the distance between the arms 30—30 and 30'—30', together with the conveyor belts, as also the number thereof, must be adapted to the circumstances.

The arms together with the conveyor belts are adjusted by first slackening the screws 51 (Figs. 8 and 9) by which the arms 30, 30' are secured to the cross members, and then shifting the arms laterally and re-locking them. If arms have to be removed, it is possible after loosening the bearing cover 37 on the bearers 27, 27' to remove the bearing blocks 28, 28' in the upward direction and, after withdrawing the shafts 32, 32', the arms, which have been released from the cross member by unscrewing, can be withdrawn laterally from the shafts 32, 32'. After the fitting of the bearing blocks in the bearers, the vertical adjustment may be effected by the screw-threaded spindle 38 and the spacings to which the arms have been adjusted on the cross member can be secured by tightening the screws 51.

What I claim and desire to secure by Letters Patent is:

1. In a device for simultaneously cutting superposed layers of packing materials into longitudinal strips, means to move said superposed layers through a plurality of rectilinearly moved cutter blades arranged one behind the other in the direction of forward feed of said layers and adapted to be displaced independently upon each other in a direction laterally to the direction of the forward feed of said superposed packing material layers and being shaped as rotatable endless band blades, C-shaped frames to support each individual blade, a chassis adapted to move said frames independently upon each other in a direction laterally to the direction of the forward feed of said packing material layers, said chassis having a plurality of juxtaposed parallel adjacent guide members at the upper and lower horizontal side, each of said guide members having a guide groove, the frames being displaceably guided in said grooves at their upper and lower longitudinal edges respectively, a screw-threaded spindle being mounted in said chassis and adapted to displace said frames, driving rollers mounted on said chassis to drive said band blades, the latter being rigidly mounted on a common shaft which is mounted perpendicularly to the planes of the frames on said chassis and means to drive said shaft.

2. A device according to claim 1, comprising guide rollers mounted on said frames to press said band blades against the driving rollers.

3. A device according to claim 1, comprising endless traveling belts to guide said packing material layers in their operative superposed position to and through said blades, said belts being arranged above and below said layers, being disposed in a laterally staggered relationship and each being guided over a pulley provided at each end of arms, which are mounted in a rake like formation at one end of a cross-member.

4. In a device according to claim 3, said arms adapted to be displaced upon said cross-members, the latter being mounted in lateral brackets, the upper cross-member being adapted to be raised and lowered for the purpose of adapting the distance between the individual rows of belts to the thickness of the layers of packing material to be cut by means of bearing blocks sliding in said brackets.

5. In a device according to claim 4, rake like arms and driven belt guiding plugs being arranged at the ends of said arms the latter being supported by said cross-members, the pulleys of one row of belts being rigidly mounted on a common driven shaft the latter being mounted on said cross member, the upper row of belts being positively driven while the lower row of belts being indirectly driven by the layers of packing materials located upon them.

6. In a device according to claim 3, a table being situated at the level of the lower row of belts on that side of the bearing brackets supporting the cross-members which is further from the arms, the said table serving to receive the layers of packing material and to introduce them between the two rows of conveyor belts.

References Cited in the file of this patent

UNITED STATES PATENTS

| | | |
|---|---|---|
| 138,443 | Sillman | Apr. 29, 1873 |
| 1,190,315 | Midgley | July 11, 1916 |
| 1,621,285 | Solomon | Mar. 15, 1927 |
| 1,678,458 | Biggert | July 24, 1928 |
| 1,711,363 | Pleger | Apr. 30, 1929 |
| 2,251,313 | Yoder | Aug. 5, 1941 |
| 2,300,278 | Hartman | Oct. 27, 1942 |

FOREIGN PATENTS

| | | |
|---|---|---|
| 15,987 | Great Britain | July 8, 1912 |
| 359,511 | Great Britain | Oct. 16, 1931 |